(12) United States Patent
Piron

(10) Patent No.: US 6,419,073 B1
(45) Date of Patent: Jul. 16, 2002

(54) PLATEN FOR DIVERTING CONVEYOR

(75) Inventor: Daniel E. Piron, Independence, KY (US)

(73) Assignee: R.A. Jones & Co. Inc., Covington, KY (US)

(*) Notice: Subject to any disclaimer, the term of this patent is extended or adjusted under 35 U.S.C. 154(b) by 0 days.

(21) Appl. No.: 09/650,124

(22) Filed: Aug. 29, 2000

(51) Int. Cl.$^7$ .............................................. B65G 47/46
(52) U.S. Cl. .............................. 198/370.03; 198/370.02
(58) Field of Search ...................... 198/370.02, 370.03

(56) References Cited

U.S. PATENT DOCUMENTS

| | | | |
|---|---|---|---|
| 3,735,867 A | * 5/1973 | Vanderhoof et al. ... | 198/370.03 |
| 3,986,596 A | 10/1976 | Hamilton | |
| 4,478,024 A | 10/1984 | Vedvik et al. | |
| 4,597,704 A | 7/1986 | Vedvik et al. | |
| 4,711,341 A | 12/1987 | Yu et al. | |
| 4,738,347 A | 4/1988 | Brouwer et al. | |
| 4,760,908 A | * 8/1988 | Houghton et al. ..... | 198/370.02 |
| 5,018,338 A | 5/1991 | Jurchuk et al. | |
| 5,038,912 A | * 8/1991 | Cotter .................... | 198/370.02 |
| 5,127,510 A | * 7/1992 | Cotter et al. ........... | 198/370.02 |
| 5,590,758 A | 1/1997 | Wilkins et al. | |
| 5,595,279 A | * 1/1997 | Wilkins et al. ........ | 198/370.02 |
| 5,967,289 A | 10/1999 | Kelsey | |

FOREIGN PATENT DOCUMENTS

JP     4-64523     * 2/1992     ............ 198/370.02

* cited by examiner

*Primary Examiner*—James R. Bidwell
(74) *Attorney, Agent, or Firm*—Wood, Herron & Evans LLP

(57) ABSTRACT

A platen has a main body of one material of relatively high durometer elastomeric material having good wear resistance and a low coefficient of friction for sliding on support tubes, and an integral upper support surface of an elastomeric material having a lower durometer and higher coefficient of friction for gripping transported articles. Preferably, the two materials are co-molded to provide an integral platen. Preferably a bead filler is entrained in the main body of the material increasing slidability. Platen apparatus and methods of making the platen apparatus are disclosed.

14 Claims, 4 Drawing Sheets

PLATEN FOR DIVERTING CONVEYOR

BACKGROUND OF THE INVENTION

The present invention pertains to platens used in diverting conveyor systems and more particularly to an improved, longer lasting platen which securely transports a load and is wear resistant.

Diverting conveyors are well known in the art and are frequently used for the sorting or rejection of a series of articles that are being transported along a moving conveyor line. Diverting conveyors are also referred to as diverter tables or slat sorters. Typical diverting conveyors are described in U.S. Pat. No. 5,590,758 to Wilkins et al. and U.S. Pat. No. 3,986,596 to Hamilton. These generally utilize either push blocks or platens to carry articles along the conveyor. Platens utilized in such conveyors are slidably mounted to a series of moving tubes or rails extending between and carried by conveyor side-chains. The platens move with and selectively slide along the tubes in a direction transverse to the motion of the conveyor to define a path in a machine direction for a load thereon. In particular, the tubes are long enough to accommodate platens disposed in at least two paths as they move with the tubes. A follower pin located on the underside of the platen engages a cam, or guide track. A series of switches located at various points along the track are utilized to divert the pins and their associated platens and thus selectively direct successive platens and articles thereon laterally to one or more branches of the track as the platens move with the tubes in a machine direction. The flow of articles along various conveyor paths according to selected or detected parameters is thus provided.

Prior platens have been molded from a single type of plastic and have employed elongated non-skid elements, such as belts or tubes, pressed into grooves on a top surface of the platen for increased friction to better grip transported articles. Other prior platens have utilized a flat non-skid panel that is glued to an ultra-high molecular weight (UHMW) plastic platen body. A drawback of these prior platens is that the pressed belts or tubes tend to become unseated from the grooves and the panels tend to become unglued after a period of use. Such conditions allow articles to slide off the platens, creating the potential for jamming or binding which can damage both the article and the conveyor.

Accordingly, there is a need for a durable platen capable of providing extended service life and which has good wear-resistance and low frictional resistance for sliding on the conveyor tubes, yet also has a higher friction surface for gripping transported articles. Thus, it is an object of the invention to provide an improved diverting conveyor platen. It is another object of the invention to provide an improved diverting conveyor platen that has increased wear resistance, yet easily slides along the support tubes of a diverting conveyor. It is a further object of the invention to provide an improved diverting conveyor platen that does not come apart while in use.

BRIEF SUMMARY OF THE INVENTION

The present invention provides an improved platen for use in diverting conveyor systems. The platen is formed from at least two different types of elastomeric material that are integrally co-molded, co-extruded, or otherwise processed together so as to provide a single unitary component which will not separate under operating conditions. The invention provides an advantage over prior platens in that the high friction support surface will not become unseated or unglued during service, thereby reducing the potential for damage and increasing the service life of the platen, while the body portion easily slides on supporting tubes and is resistant to wear.

The present invention contemplates an integral co-molded platen of two distinct materials. A main body portion is comprised of a relatively high durometer elastomeric material having good wear-resistance and a low friction coefficient for durability and ease of sliding on conveyor tubes. A preferred material is urethane with a hardness in the range of about 70 to 75 Shore-D durometer. A co-molded, integral support surface of the platen is integrally formed with the main body. The support surface is comprised of an elastomeric material which has a lower hardness than the main body and the support surface also has a higher friction coefficient for gripping transported articles. A preferred material is urethane with a hardness in the range of about 70 to 75 Shore-A durometer.

A platen diverting pin or cam follower is located on a bottom surface of the platen for engaging the guide track on a diverting conveyor. The pin can be molded into the body. In a preferred embodiment, however, an insert with a tapped hole is molded into the body and a threaded metallic pin is installed in the insert after the platen has been molded. In this way the pin may easily be replaced in the event that it becomes damaged or worn in service.

In another aspect of the invention, the platen body has beveled edges formed along the leading and trailing edges of the platen to reduce binding against a conveyed article, thereby reducing the potential for damage to the article or the conveyor.

In a further aspect of the invention, the surface of the body is contoured to positively engage the conveyor tubes.

In another aspect of the invention, the support surface includes contours that are formed into it to provide increased gripping of transported articles.

In yet another aspect of the invention, the main body is formed with an elastomeric filler that has lubricating qualities for providing increased slidability and wear-resistance as the surface of the body becomes abraded during use while sliding on the conveyor tubes. In a preferred embodiment, the filler consists of UHMW poly-beads in a matrix of urethane.

A preferred method for making an improved diverting conveyor platen in a mold includes the steps of: (a) positioning a tapped insert in a mold cavity; (b) filling the mold cavity with urethane in the range of 70–75 durometer, Shore D; (c) filling a second mold cavity with urethane in the range of 70–75 durometer, Shore A; (d) closing the mold; (e) applying heat and pressure, (f) opening the mold; and (g) removing the formed integral platen.

Accordingly, the invention provides a durable, integral platen which has a support surface made from a high friction material for gripping transported loads, and which has a main body made from a wear-resistant, low friction material for improved slidability on diverting conveyor tubes. The support surface and the main body are formed into a single, integral unit which will not separate under operating conditions. These and other aspects of the invention will be apparent from the following description, the claims, and the attached drawings.

DETAILED DESCRIPTION OF THE INVENTION

Figure 1:
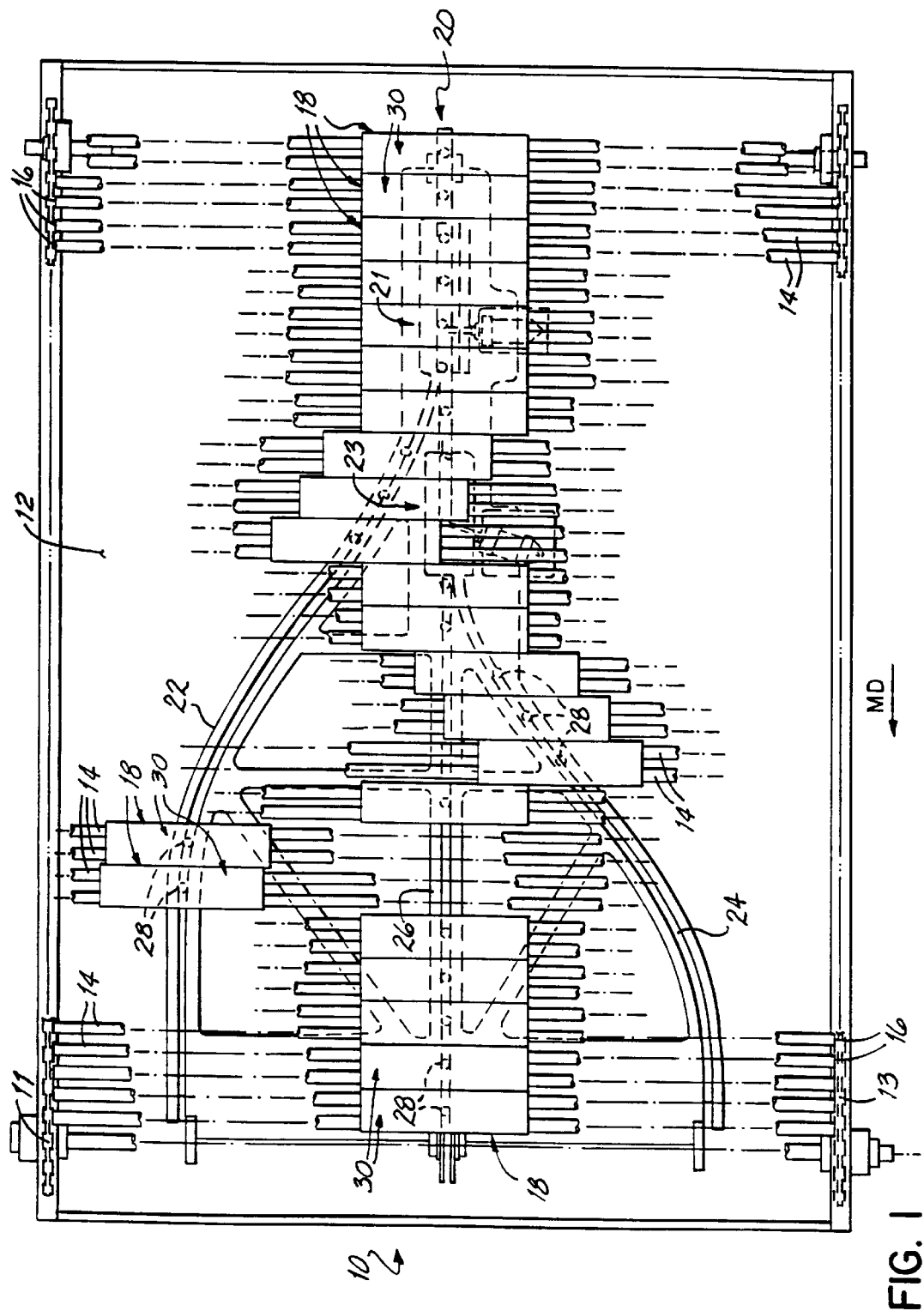
FIG. 1 is a plan view of a typical diverting conveyor.
Figure 2:
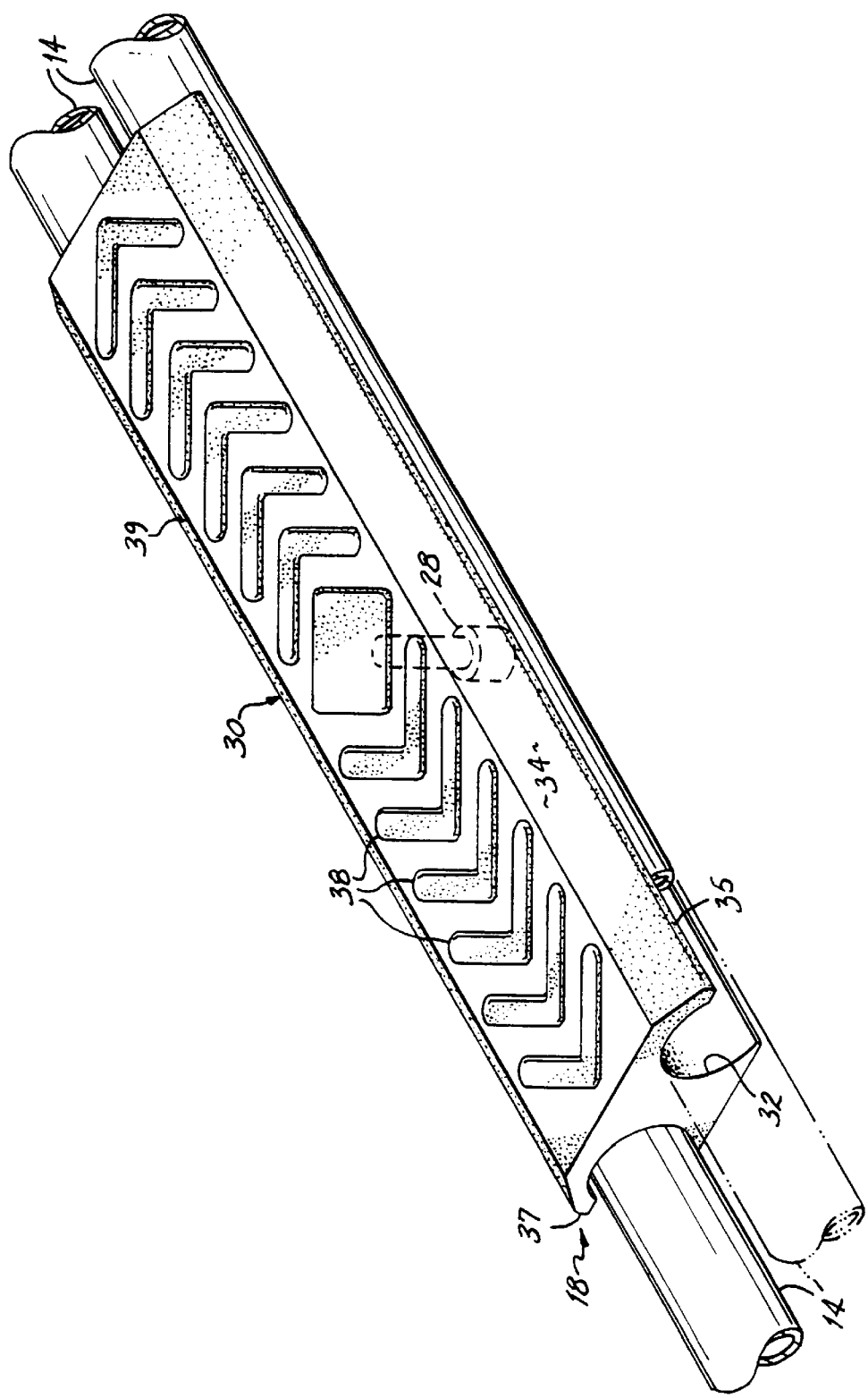
FIG. 2 is an isometric view of one embodiment of the present invention.

Referring to FIGS. 1 and 2, a diverting conveyor 10 has a moving conveyor surface 12 defined by a series of tubes 14. Tubes 14 are fixed at their respective ends 16 to support mechanisms such as respective drive chains 11 and 13. The tubes are conveyed along the diverter 10 in a continuous fashion. Platens 18 are slidably attached to tubes 14. The platens 18 are shorter than the tubes 14 and can be moved transversely across them.

A guide track 20 is located beneath the conveyor surface 12 and has branches and respective associated cam slots 22 and 24 diverting from the main branch 26. Pins or cam followers 28 are attached to the underside of platens 18 and engage the guide track 20 as the conveyor tubes 14 are conveyed along in a machine direction "MD". The path of a given platen or group of platens is determined by the engagement of the pin 28 thereof in a given guide track 20. Selectively controllable branch switches 21 and 23 are positioned along the guide track 20 and can be activated to divert a platen away from the main branch 26 to a diverted branch 22 or 24 as determined by detected or selected parameters.

Figure 3:
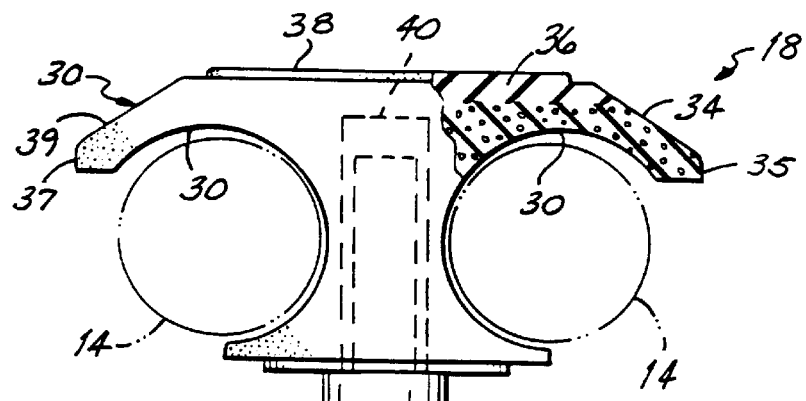
FIG. 3 is an end view of the platen of FIG. 2, with a broken section to show material boundaries and phantom lines representing the location of conveyor tubes relative to the platen.

In accordance with the present invention, FIGS. 2 and 3 show one embodiment of a platen for use in a diverting conveyor 10. Platen 18 is comprised of a body 30, molded with contoured surfaces 32 operatively conforming to and positively engaging adjacent tubes 14 of diverting conveyor 10. Body 30 is formed from a high durometer elastomeric material with sufficiently low friction coefficient so as to provide ease of sliding and resistance to wear as the platen moves along tubes 14. Preferably, the body is formed from molded urethane, and in a more preferred embodiment the urethane has a hardness in the range of about 70 to 75 durometer, Shore D. In an even more preferred embodiment of the invention, the body also contains a filler consisting of UHMW poly-beads. When the urethane body 30 wears, the beads are exposed, providing a lubricious, slick contact surface for improved sliding of the platen 18 on tubes 14. Body 30 has beveled edges 34, formed proximate leading edge 35 and trailing edge 37, that span the transverse length of the platen 18. Beveled edges 34 serve to reduce binding against transported articles.

As depicted in FIGS. 2 and 3, a support surface 36 of platen 18 is integrally molded with the body 30. The support surface 36 is formed from an elastomeric material having a lower hardness and greater friction coefficient than the material used for the body 30 and is preferably urethane. In an even more preferred embodiment the top surface is formed from molded urethane having a hardness in the range of about 70 to 75 durometer, Shore A. In another preferred embodiment, support surface 36 further includes contours 38 formed into the surface for providing increased gripping of transported articles.

Figure 4:
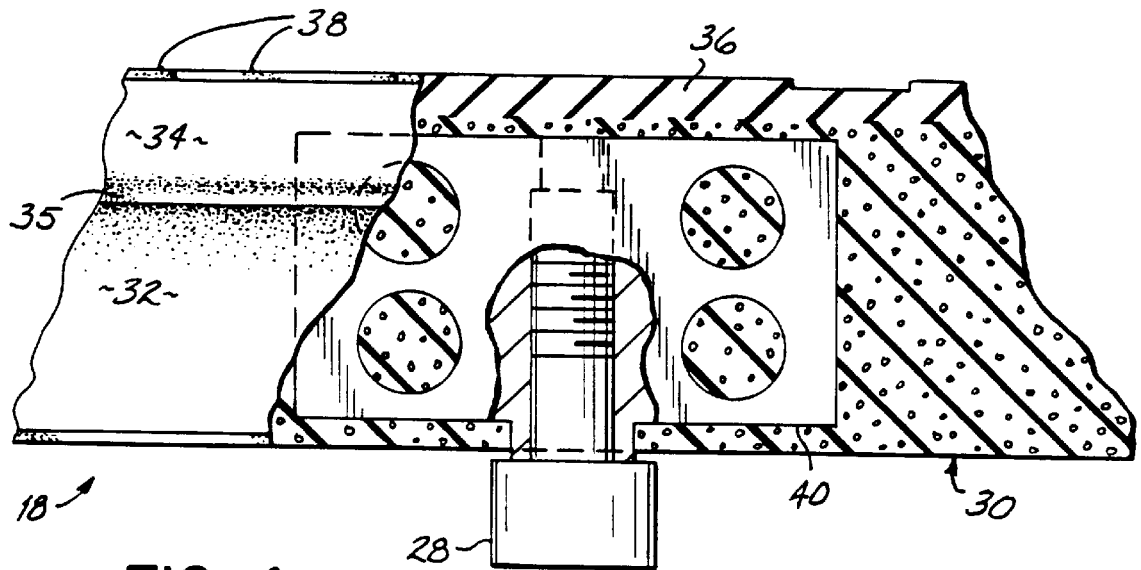
FIG. 4 is a partial front elevational view of the platen of FIG. 2 with a broken section showing details of an insert for accommodating a threaded pin.

Referring to FIGS. 2 through 4, pin 28 is attached to platen 18 proximate a lower surface of the platen and extends downwardly away from the platen. When installed in a diverting conveyor, pin 28 engages track 20 whereby the path of the platen along the conveyor is determined by selectable switches located along the track 20. In FIG. 4, one embodiment of the present invention includes a tapped insert 40 integrally formed into the body 30 of platen 18 during the molding process. Pin 28 is removably installed into insert 40 after the platen has been molded so that pin 28 can be easily replaced if damaged.

Figure 5:
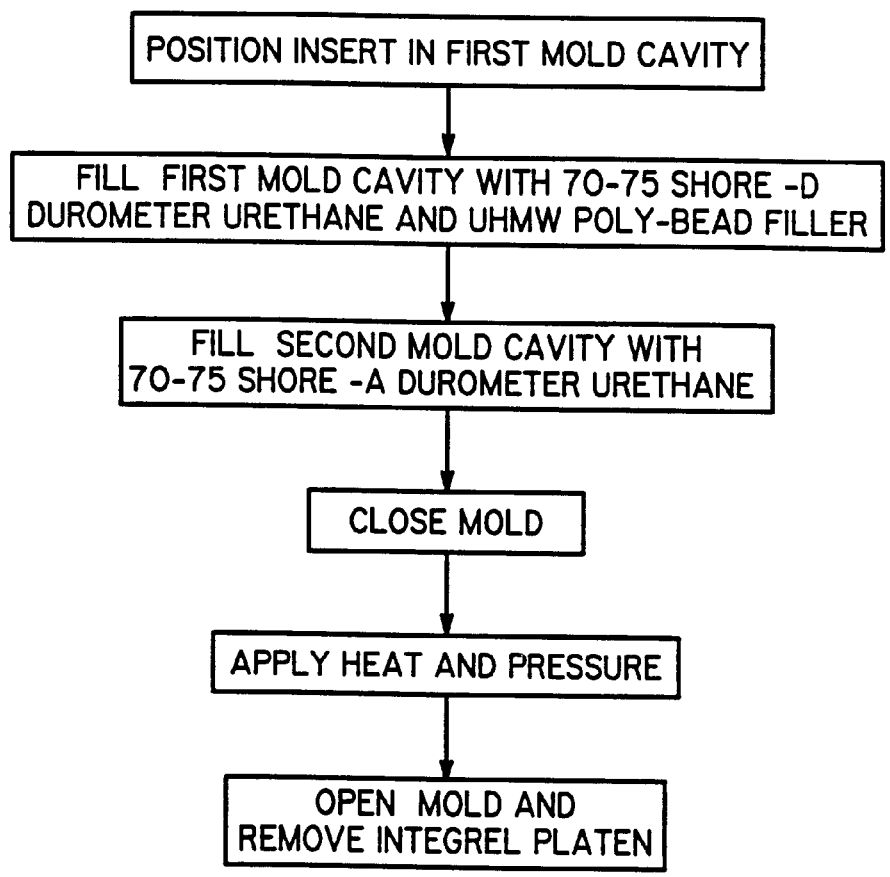
FIG. 5 is a flow chart depicting the steps involved in making one embodiment of a platen according to the present invention.

FIG. 5 depicts the steps involved in making an integral platen according to one embodiment of the present invention. In particular, an insert is positioned in a first cavity of a mold. The cavity is filled with a relatively hard urethane and UHMW poly-bead filler. A second cavity of the mold is filled with a relatively lower hardness urethane and the mold is closed. Heat and pressure are applied to the closed mold to form an integral platen. The mold is then opened and the integral platen is removed.

It will be appreciated that these and other embodiments and modifications will be readily apparent to those of ordinary skill in the art without departing from the scope of the invention, and the applicant intends to be bound only by the claims appended hereto.

What is claimed is:

1. An integral platen for use in a diverting conveyor, comprising:
   an elongated platen body formed from a high durometer elastomeric material: and
   a support surface integrally formed with the platen body and disposed proximate an upper portion of the platen body, the support surface being formed from an elastomeric material of lower durometer than the body.

2. The platen of claim 1 further comprising an insert molded into the body and disposed proximate a lower portion of the body, the insert adapted to accommodate a cam follower for engaging a guide track when the platen is positioned on a diverting conveyor.

3. The platen of claim 1 further comprising a cam follower attached to the body proximate a lower portion of the body and extending outward from the body so as to engage a guide track when positioned on a diverting conveyor.

4. The platen of claim 1 wherein the body includes a contoured surface formed into the body operatively conforming to and engaging a support element of a diverting conveyor.

5. The platen of claim 4 further comprising beveled edges formed into the body and positioned proximate a leading edge and a trailing edge of the platen to reduce binding against a conveyed article.

6. The platen of claim 5 wherein the body is formed from an elastomeric material with a low friction coefficient for improved slidability and wear resistance when used in a diverting conveyor.

7. The platen of claim 6 wherein the elastomer for the body is urethane.

8. The platen of claim 7 wherein the hardness of the urethane is in the range of about 70 to 75 durometer, Shore D.

9. The platen of claim 8 further comprising a plurality of elastomeric beads formed within the body as a filler to provide increased slidability and wear resistance as the surface is abraded during use.

10. The platen of claim 9 wherein the filler consists of UHMW poly-beads.

11. The platen of claim 10 wherein the support surface is formed from an elastomeric material with a high friction coefficient for improved load gripping capability.

12. The platen of claim 11 wherein the elastomer of the support surface is urethane.

13. The platen of claim 12 wherein the hardness of the urethane is in the range of about 70 to 75 durometer, Shore A.

14. The platen of claim 13 wherein the support surface further includes formed contours for improved load gripping capability.

* * * * *